United States Patent
Giroux

(10) Patent No.: US 8,438,946 B2
(45) Date of Patent: May 14, 2013

(54) HANDLEBAR FOR A BICYCLE

(75) Inventor: Michel Giroux, Jonquiere (CA)

(73) Assignee: Societe de Velo en Libre-Service, Montreal, Quebec (CA)

( * ) Notice: Subject to any disclaimer, the term of this patent is extended or adjusted under 35 U.S.C. 154(b) by 88 days.

(21) Appl. No.: 12/995,975

(22) PCT Filed: Jun. 4, 2009

(86) PCT No.: PCT/CA2009/000783
§ 371 (c)(1),
(2), (4) Date: Jan. 24, 2011

(87) PCT Pub. No.: WO2009/146551
PCT Pub. Date: Oct. 12, 2009

(65) Prior Publication Data
US 2011/0120256 A1    May 26, 2011

Related U.S. Application Data

(60) Provisional application No. 61/059,404, filed on Jun. 6, 2008.

(51) Int. Cl.
*B62K 21/12* (2006.01)
(52) U.S. Cl.
USPC ............................................. 74/551.5
(58) Field of Classification Search ............ 74/488, 74/489, 502.2, 551.1, 551.2, 551.9, 551.8; 280/280, 281.1, 288.3; 16/421
See application file for complete search history.

(56) References Cited

U.S. PATENT DOCUMENTS

| | | | | |
|---|---|---|---|---|
| 3,742,777 | A | * | 7/1973 | Mathauser ................... 474/81 |
| 4,245,522 | A | * | 1/1981 | Robinson .................. 74/480 R |
| 4,966,047 | A | | 10/1990 | Krauer et al. |
| 5,370,017 | A | | 12/1994 | Krauer |
| 6,122,991 | A | | 9/2000 | Clarkson |
| 6,983,949 | B2 | | 1/2006 | Ueno et al. |
| 7,114,738 | B1 | | 10/2006 | Chen |
| 7,210,694 | B2 | | 5/2007 | Trenne |
| 2004/0188976 | A1 | * | 9/2004 | Schmider ..................... 280/279 |
| 2006/0145446 | A1 | * | 7/2006 | Schmider .................. 280/281.1 |
| 2006/0169094 | A1 | | 8/2006 | Fukui |
| 2008/0087131 | A1 | * | 4/2008 | Tetsuka ....................... 74/502.2 |
| 2011/0115193 | A1 | * | 5/2011 | Giroux ....................... 280/281.1 |
| 2011/0121538 | A1 | * | 5/2011 | Giroux ........................... 280/280 |

FOREIGN PATENT DOCUMENTS

| | | | |
|---|---|---|---|
| JP | 06144324 A | * | 5/1994 |
| JP | 06144325 A | * | 5/1994 |

OTHER PUBLICATIONS

International Search Report for International Application No. PCT/CA2009/000783 mailed Sep. 8, 2009.

* cited by examiner

*Primary Examiner* — Vicky Johnson
(74) *Attorney, Agent, or Firm* — Pearl Cohen Zedek Latzer, LLP

(57) ABSTRACT

The present invention generally pertains to a handlebar assembly for a bicycle. More specifically, the present invention relates to a handlebar assembly comprising a hollow body in which are routed control cables needed for breaking and gear shifting.

16 Claims, 14 Drawing Sheets

HANDLEBAR FOR A BICYCLE

CROSS-REFERENCE TO RELATED APPLICATIONS

This patent application is a National Phase Application of PCT International Application No. PCT/CA2009/000783, entitled "HANDLEBAR FOR A BICYCLE", International Filing Date Jun. 4, 2009, published on Dec. 10, 2009 as International Publication No. WO 2009/146551, which in turn claims priority from U.S. Provisional Patent Application No. 61/059,404, filed Jun. 6, 2008, both of which are incorporated herein by reference in their entirety.

This application is related to U.S. Provisional Patent Application Ser. No. 61/059,421 entitled SADDLE ANTI-THEFT DEVICE, filed on Jun. 6, 2008, the specification of which is hereby incorporated by reference.

This application is also related to U.S. Provisional Patent Application Ser. No. 61/059,387 entitled BICYCLE FRAME AND CASING FOR INTERNALLY ROUTED CABLES, filed on Jun. 6, 2008, the specification of which is hereby incorporated by reference.

This application is further related to U.S. Provisional Patent Application Ser. No. 61/059,413 entitled FORK ASSEMBLY FOR A BICYCLE, filed on Jun. 6, 2008, the specification of which is hereby incorporated by reference.

FIELD OF THE INVENTION

The present invention generally relates to a handlebar assembly for a bicycle. More specifically, the present invention relates to a handlebar assembly comprising a hollow body in which are routed control cables needed for breaking and gear shifting.

BACKGROUND OF THE INVENTION

Bicycles have been utilized as means of transportation for over a hundred years. Modern bicycles generally include control cables which are used to control front and rear wheel braking systems, and front and rear shifting mechanisms. Typically, the cables are routed from brake and shift levers to the braking systems and derailleur. The bicycle may also have wires for an odometer and front and rear lights. Those cables and wires are generally mounted along the outside of the bicycle frame with various attachments such as clips.

Cables and wires can interfere with either the rider or other components of the bicycles (e.g. tool compartment attached to the frame). Externally located cables and wires are susceptible to damage from the surrounding environment (e.g. tree, branches) and also to vandalism. The cables may also detract from the aesthetic appearance of the frame by covering art or graphic logos.

For different reasons, many cities have inaugurated in the recent years bicycle sharing programs whereby citizens can easily have access to bicycles for inner-city transportation. Although very popular, those programs have to struggle against theft and vandalism. There is therefore an urgent need for new bicycles with a singular design of frames for preventing vandalism or disassembly or the stealing of parts.

Prior attempts have been made to conceal bicycle cables and wires by extending the cables through the inside of the bicycle frame components. Examples can be found in U.S. Pat. No. 7,114,738 and U.S. patent applications No. US 2004/0188976 and US 2006/0145446. However, those frames do not address all of the above-identified problems, either because they maintain some exposed segments of cables, because they are too complex, because the configuration of the frame is such that cables wear prematurely due to continuous scrubbing against the frame, or because they are not adaptable to bicycles designed to be used in bicycle sharing programs. The same is true with handlebars of the prior art.

Therefore, it would be desirable to be provided with a handlebar for a bicycle that would contribute to alleviate at least one of the above-mentioned drawbacks.

BRIEF SUMMARY

According to one embodiment, there is provided a handlebar for a bicycle provided with a fork assembly.

According to one embodiment, there is provided a handlebar for a bicycle provided with a fork assembly, the handlebar comprising a hollow body comprising a left end, a right end and at least one control opening located proximal to at least one of the left end and the right end of the hollow body; a fork mounting portion extending between the left end and the right end of the hollow body and being adapted for mounting the handlebar to the fork assembly; a left handle shaft extending from the left end of the hollow body; a right handle shaft extending from the right end of the hollow body; at least one control mounted to at least one of the left handle assembly and the right handle assembly proximal to the at least one control opening such that the at least one control opening and the fork opening enable routing of at least one control cable running from the at least one control toward the fork assembly inside the hollow body, the at least one control cable remaining unexposed during operation of the at least one control.

In accordance with an embodiment, the handlebar is V-shaped.

In accordance with an embodiment, the at least one control is selected from a group consisting of a break lever assembly and a gear shifter.

In accordance with an embodiment, the hollow body comprises a left control opening located proximal to the left end of the hollow body and a right control opening located proximal to the right end of the hollow body and the at least one control comprises a left brake lever assembly mounted to the left handle shaft proximal to the left control opening, a right brake lever assembly mounted to the right handle shaft proximal to the right control opening and a gear shifter mounted to the right handle shaft proximal to the right control opening.

In accordance with an embodiment, the hollow body comprises a central stem portion defining the fork mounting portion and having a left end, a right end, a plan bottom face and a plan top face extending between the left end and the right end.

In accordance with an embodiment, the plan bottom face and the plan top face are connected to one another using a pair of spaced-apart back and front curved faces.

In accordance with an embodiment, the hollow body further comprises a left handle mounting portion having a lower end and an upper end, the left handle mounting portion extending from the left end of the central stem portion, the hollow body further comprising a right handle mounting portion having a lower end and an upper end, the right handle mounting portion extending from the right end of the central stem portion.

In accordance with an embodiment, the left handle mounting portion, the central stem portion and the right handle mounting portion define an integral structure.

In accordance with an embodiment, the left handle mounting portion and the right handle mounting portion are S-shaped.

In accordance with an embodiment, the upper end of the left handle mounting portion comprises a left opening for receiving a portion of the left brake lever assembly; the right handle mounting portion comprises a right opening for receiving a portion of the right brake lever assembly and a portion of the gear shifter.

In accordance with an embodiment, the left opening comprises a left mounting member and the right opening comprises a right mounting member.

In accordance with an embodiment, the left handle shaft is fixedly mounted to the left mounting member of the left opening and the right handle shaft is fixedly mounted to the right mounting member of the right opening.

In accordance with an embodiment, the handlebar further comprises at least one handle grip mounted over at least one of the left handle shaft and the right handle shaft.

In accordance with an embodiment, the at least one handle grip is manufactured using a material selected from a group consisting of rubber, plastic, polyvinyl chloride (PVC) and elastomer.

In accordance with an embodiment, the left brake lever assembly comprises a left bracket mountable to the left handle shaft, a left lever mounted to the left bracket for pivotal movement relative thereto and a left brake cable connector connected to the left lever.

In accordance with an embodiment, the right brake lever assembly comprises a right bracket mountable to the right handle shaft, a right lever mounted to the right bracket for pivotal movement relative thereto and a right brake cable connector connected to the right lever.

In accordance with an embodiment, the gear shifter comprises a twist-grip shifter having an annular base member for mounting the gear shifter to the right handle shaft and a twist grip operating member rotatably mounted on the annular base member for enabling a user to modify a bicycle gear ratio, said gear shifter further comprising a cable connector.

In accordance with an embodiment, the hollow body is manufactured using a material selected from a group consisting of aluminum, carbon fibers, steel, titanium and magnesium.

In accordance with an embodiment, the hollow body comprises a left hollow body portion and a right hollow body portion, the left handle shaft and the right handle shaft being connected to the fork mounting portion and extending through the left hollow portion and the right hollow portion.

In accordance with an embodiment, the left handle shaft, the right handle shaft and the fork mounting portion define an integral structure.

In accordance with another embodiment, the left handle shaft and the right handle shaft are S-shaped.

In accordance with yet another embodiment, the left hollow body portion and the right hollow body portion each comprises a back shell and a front shell.

In accordance with a further embodiment, the back shells and the front shells of the left hollow body portion and the right hollow body portion are secured to the left handle shaft and the right handle shaft using securing means.

In accordance with an embodiment, the securing means comprises threaded fasteners.

These and other objects, advantages and features of the present invention will become more apparent to those skilled in the art upon reading the details of the invention more fully set forth below.

BRIEF DESCRIPTION OF THE DRAWINGS

Having thus generally described the nature of the invention, reference will now be made to the accompanying drawings, showing by way of illustration an illustrative embodiment thereof, and in which.

DETAILED DESCRIPTION

Figure 1:
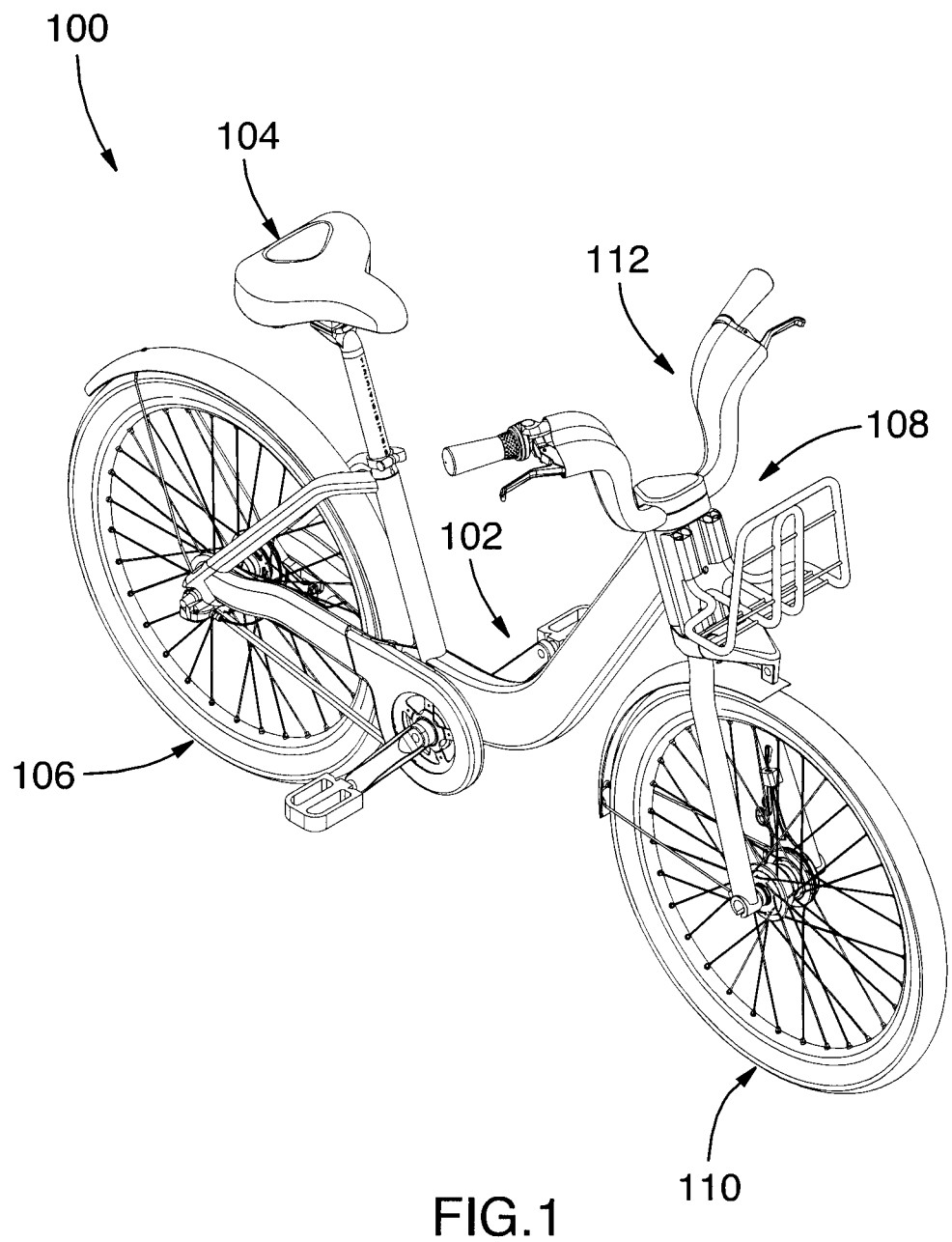
FIG. 1 is a front perspective view of a bicycle in accordance with one embodiment of the present invention.

The description which follows, and the embodiments described therein are provided by way of illustration of an example, or examples of particular embodiments of principles and aspects of the present invention. These examples are provided for the purpose of explanation and not of limitation, of those principles of the invention. In the description that follows, like parts are marked throughout the specification and the drawings with the same respective reference numerals.

With reference to FIG. 1, a bicycle will be described in accordance with one embodiment of the present invention, using the reference numeral 100. The bicycle 100 comprises a frame 102, a seat assembly 104 mounted to the frame 102 for a user to sit on the bicycle 100 and a rear wheel 106 rotatably mounted to the frame 102. The bicycle further comprises a fork assembly 108 operatively mounted to the frame 102 and a front wheel 110 rotatably mounted to the fork assembly 108. Mounted on the fork assembly 108 is a handlebar 112 for allowing the user to control the direction of the bicycle 100, as it will become apparent below.

Figure 2:
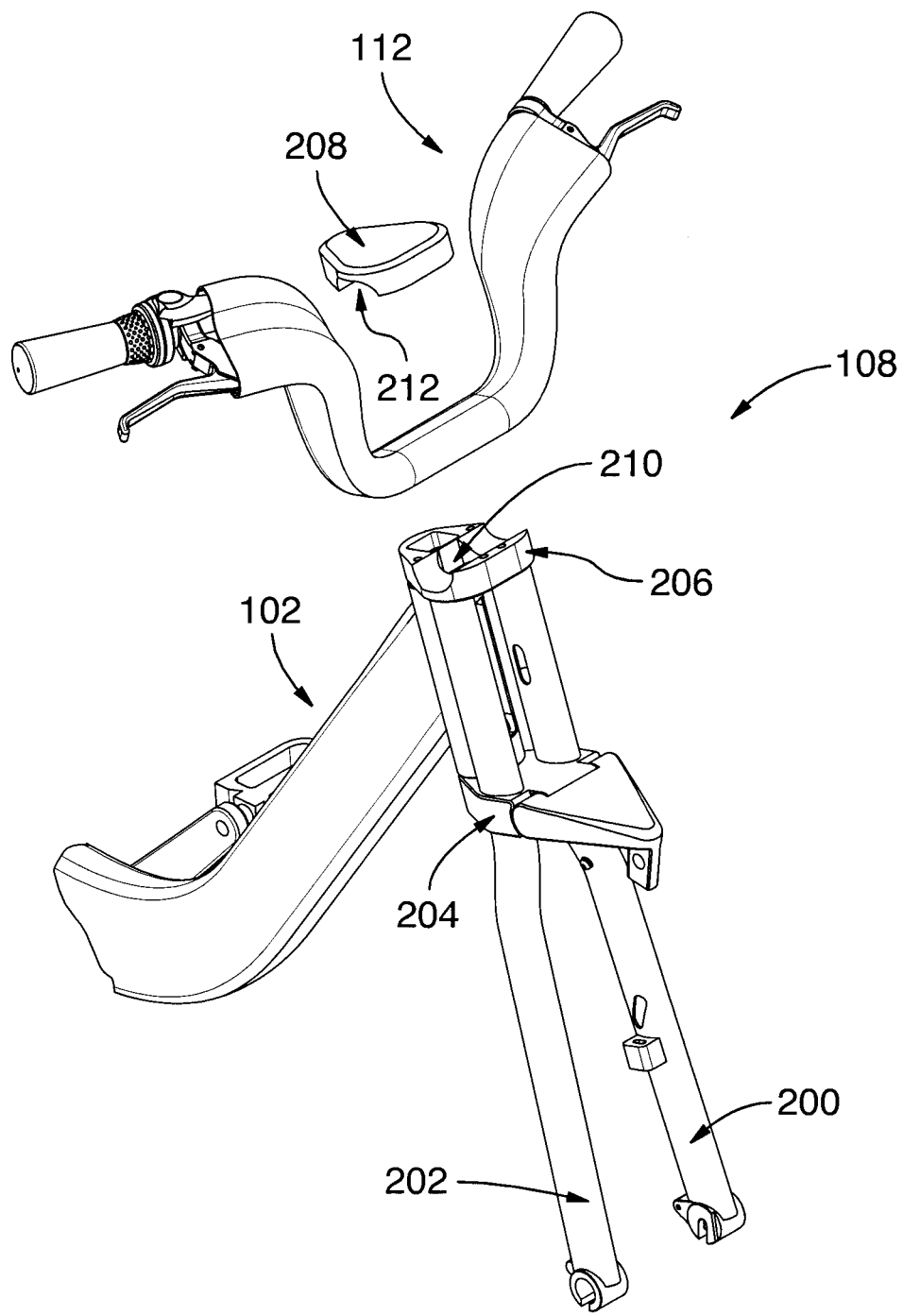
FIG. 2 is an enlarged front left perspective view of the fork assembly of the bicycle shown in FIG. 1, with the handlebar and stem cover removed.

Turning to FIG. 2, the fork assembly 108 comprises a pair of spaced-apart blades 200, 202 assembled to one another in a side-by-side relation by a crown plate 204 and a spaced-apart stem plate 206. The fork assembly further comprises a steer assembly (not shown) operably mounted to the crown plate 204 and the stem plate 206 for rotatably mounting the fork assembly 108 to the frame 102 of the bicycle 100. The fork assembly 108 further comprises a stem cover 208 for mounting the handlebar 112 to the stem plate 206, as it will become apparent below. Such a fork assembly 108 is described in co-pending US patent application entitled FORK ASSEMBLY FOR A BICYCLE, filed on Jun. 6, 2008, the specification of which is incorporated herein by reference.

Figure 3:
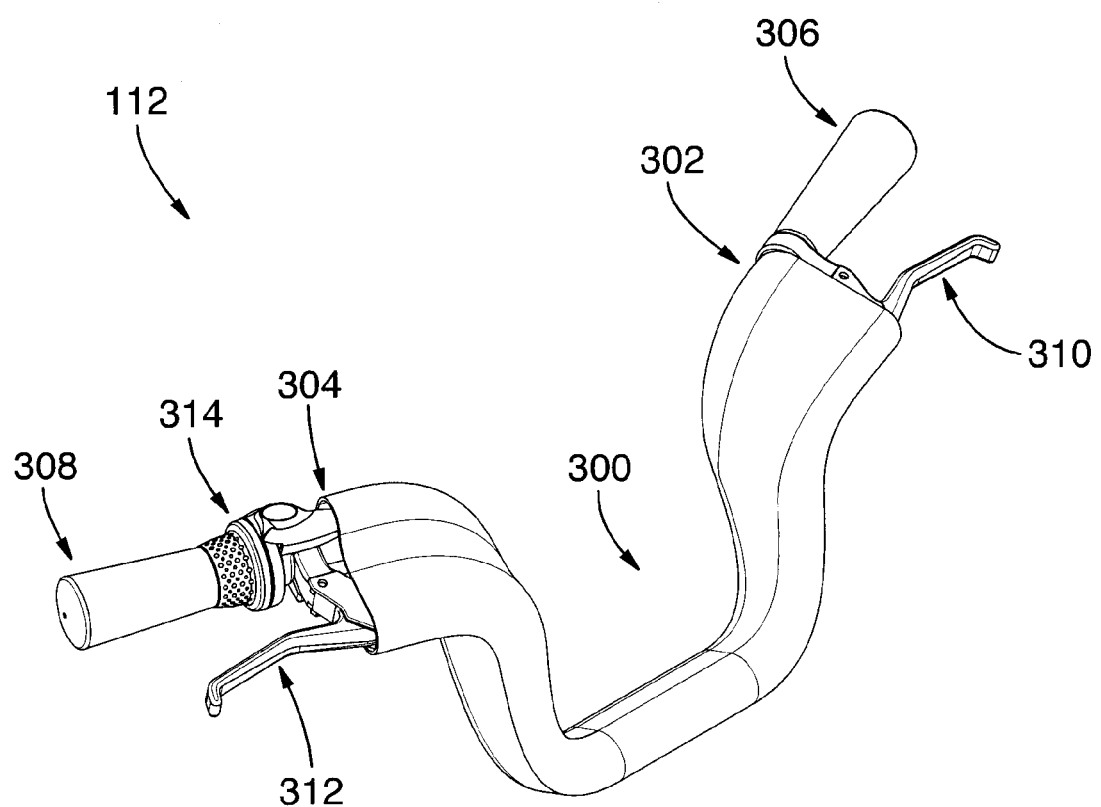
FIG. 3 is a front right perspective view of a handlebar in accordance with one embodiment of the present invention.

According to one embodiment of the present invention, the handlebar 112 is an upright-type handlebar and comprises a generally V-shaped hollow body 300 having a left end 302 and a right end 304, and a pair of handle assemblies 306, 308 mounted at the left and right ends 302, 304 of the hollow body 300 (shown in FIG. 3). The handlebar 112 is further provided with left and right brake lever assemblies 310, 312 which are an example of a control. The left brake level assembly 310 is mounted at the junction of the left handle assembly 306 and the left end 302 of the hollow body 300. Similarly, the right brake lever assembly 312 is mounted at the junction of the right handle assembly 308 and the right end 304 of the hollow body 300, respectively. A gear shifter 314 is also provided on the right handle assembly 308, as it will become apparent below.

Figure 4:
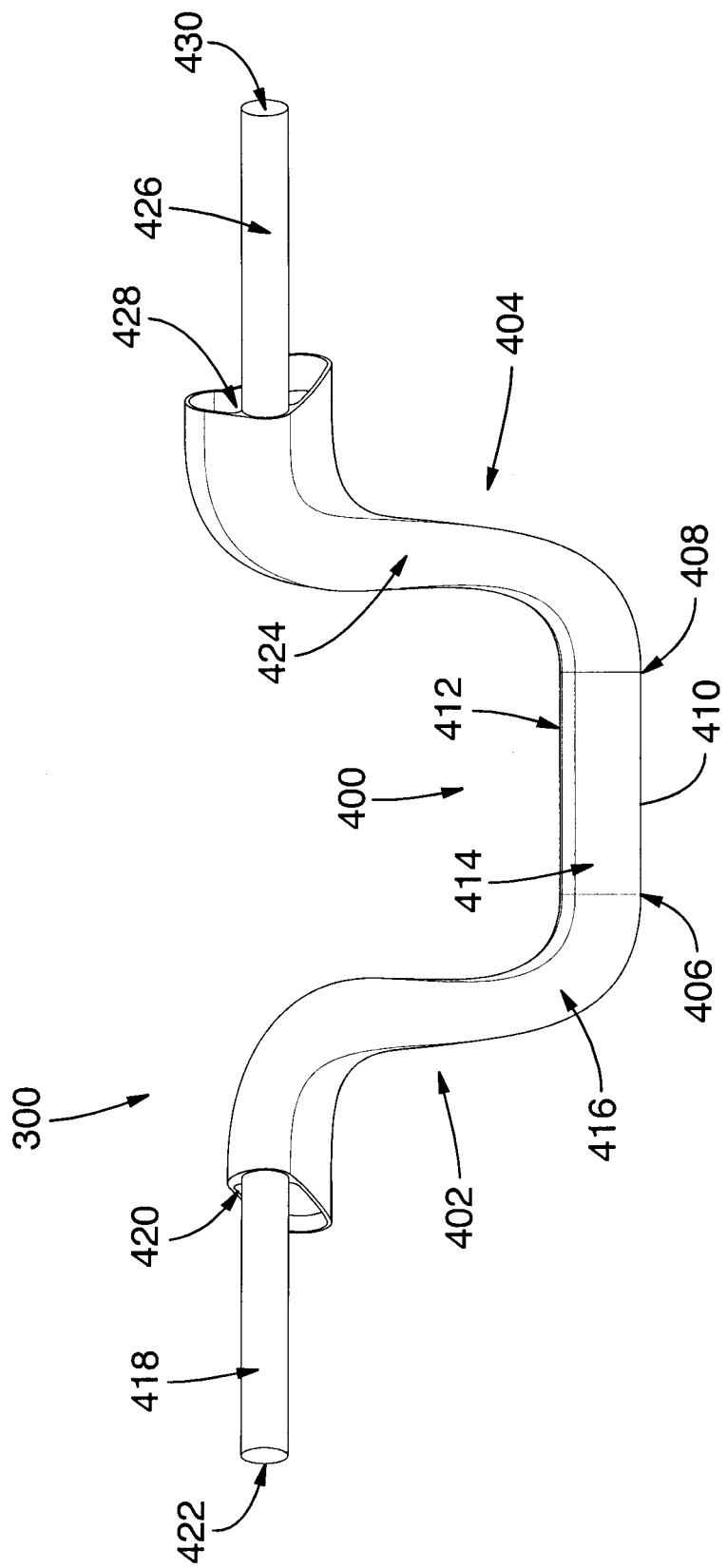
FIG. 4 is a back elevation view of a hollow body in accordance with one embodiment of the present invention.
Figure 5:
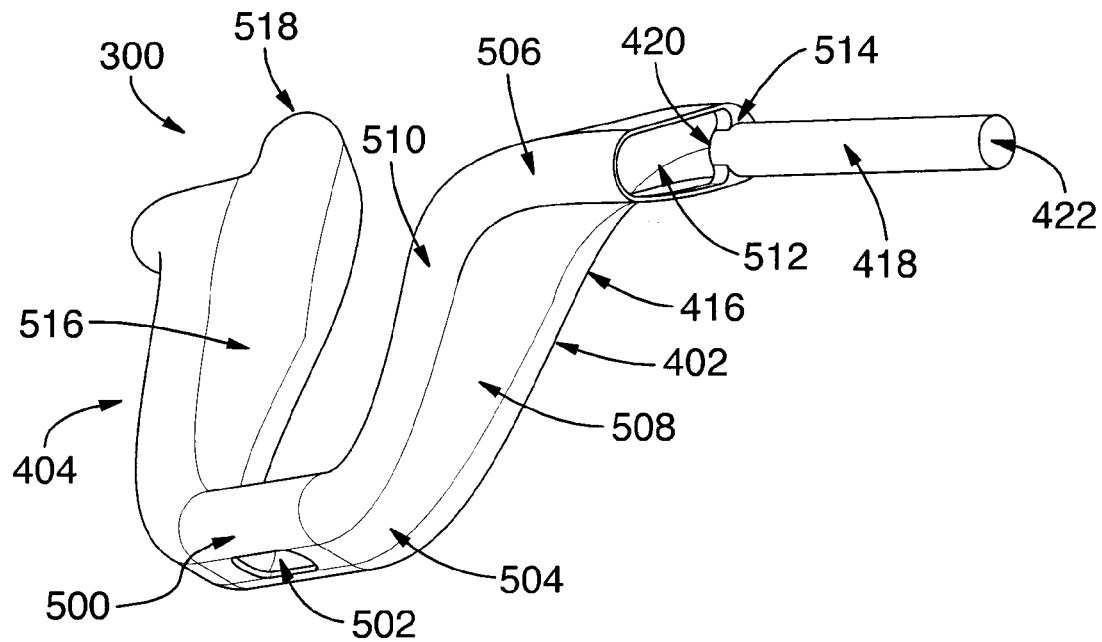
FIG. 5 is a front left perspective view of the hollow body shown in FIG. 4.
Figure 6:
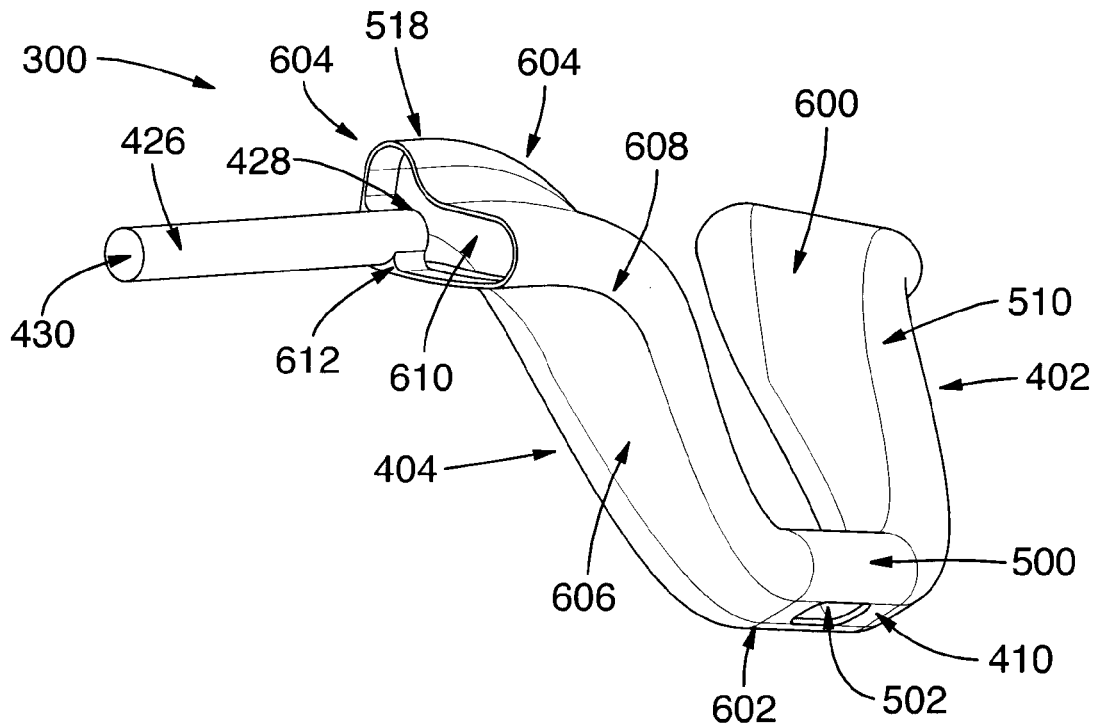
FIG. 6 is a front right perspective view of the hollow body shown in FIG. 4.

With reference to FIGS. 4 to 6, the V-shaped hollow body 300 is provided with a lower, central stem portion 400 from which upwardly and outwardly extends a pair of left and right handle mounting portions 402 and 404. More specifically, the central stem portion 400 comprises a left end 406, a right end 408, a plan bottom face 410 and a plan top face 412 extending between the left and right ends 406, 408. The plan bottom and top faces 410, 412 are connected to one another by a pair of spaced-apart back and front curved faces 414, 500. Together, the bottom, top, back and front faces 410, 412, 414 and 500 define a tube having an oblong cross-section (best shown in FIG. 10) adapted for being mounted to the stem plate 206 of the fork assembly 108, as best described below. On the bottom face 410 thereof, the central stem portion 400 is provided with an opening 502, for allowing the passage of control cables running inside the central stem portion 400 toward the fork assembly 108, as best described below.

The lower, central stem portion 400 and the left and right handle mounting portions 402 and 404 preferably define an integral structure. In this embodiment, the V-shaped hollow body 300 may be manufactured from a unique tube of material shaped to attain the previously described configuration. In one embodiment, the V-shape hollow body 300 is manufactured from an aluminium tube by superplastic forming (SPF). The material may also comprise carbon fibres, steel, titanium, magnesium, or any other material that possesses the desired strength, durability, lightness or any other qualities that one skilled in the art might consider useful and appropriate. A person skilled in the art will appreciate that based on the material used, other manufacturing methods may be used, such as, for instance, molding.

Connected to the left and right ends 406, 408 of the central portion 400 are the spaced-apart left and right handle mounting portions 402, 404. The left handle mounting portion 402 is generally S-shaped and comprises a lower end 504 connected to the left end 406 of the central portion 400 and an upper end 506. As best shown in FIG. 5, the upper end 506 is located above the lower end 504 and extends outwardly (i.e. toward the left side of the bicycle 100) and gently backwardly (i.e. toward the user on the bicycle 100). Similarly to the central portion 400, the left handle mounting portion 402 is a hollow tube having a generally oblong cross-section. More specifically, the left handle mounting portion 402 comprises an internal, top face 600, a spaced-apart external, bottom face 508, a curved front face 510 and a curved back face 416, the curved front and back faces 510 and 416 connecting the internal, top face 600 and the external bottom face 508 to one another.

Figure 12:
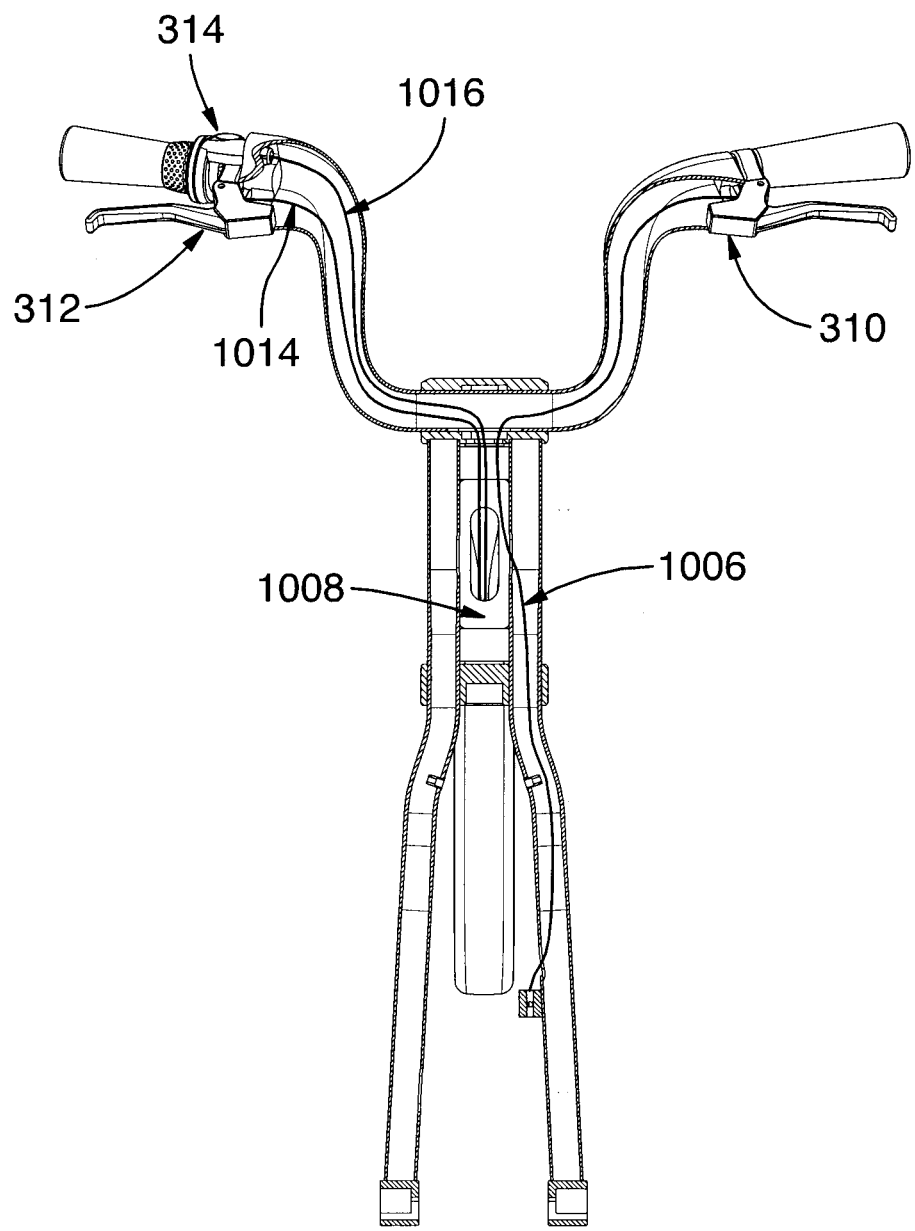
FIG. 12 is a cross-section view of the bicycle shown in FIG. 11, taken along line 12-12.

At the upper end 506 thereof, the left handle mounting portion 402 is provided with an opening 512 for receiving therein a portion of the left brake lever assembly 310 and allowing the passage of a front brake cable 1006 (show in FIGS. 10 and 12), as it will become apparent below. As best shown in FIGS. 5 and 6, the internal, top face 600 and the external, bottom face 508 are leaning downwardly proximal to the upper end 506 of the left handle mounting portion 402. In other words, the curved front face 510 is located slightly below the curved back face 416 at this location, such that the opening 512 is inclined from the back toward the front of the bicycle 100. This configuration enables the reception of a portion of the left brake lever assembly 310 in the opening 512, while providing a user with an ergonomic position for actuating the brake lever assembly 310 during the operation of the bicycle 100, as it will become apparent below.

Figure 7:
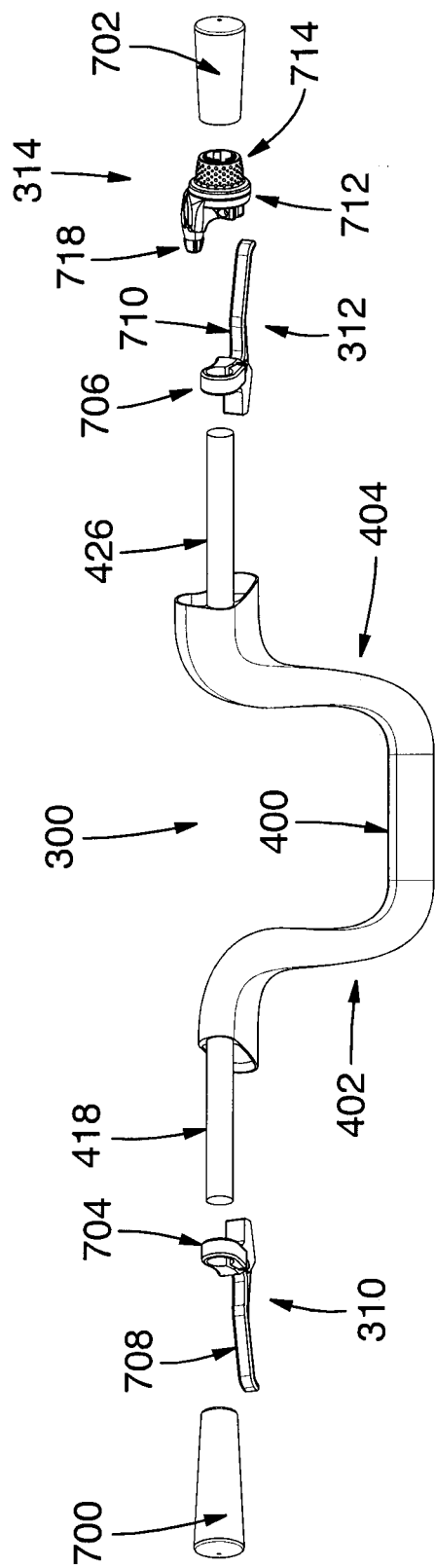
FIG. 7 is a back exploded view of the handlebar shown in FIG. 3.
Figure 8:
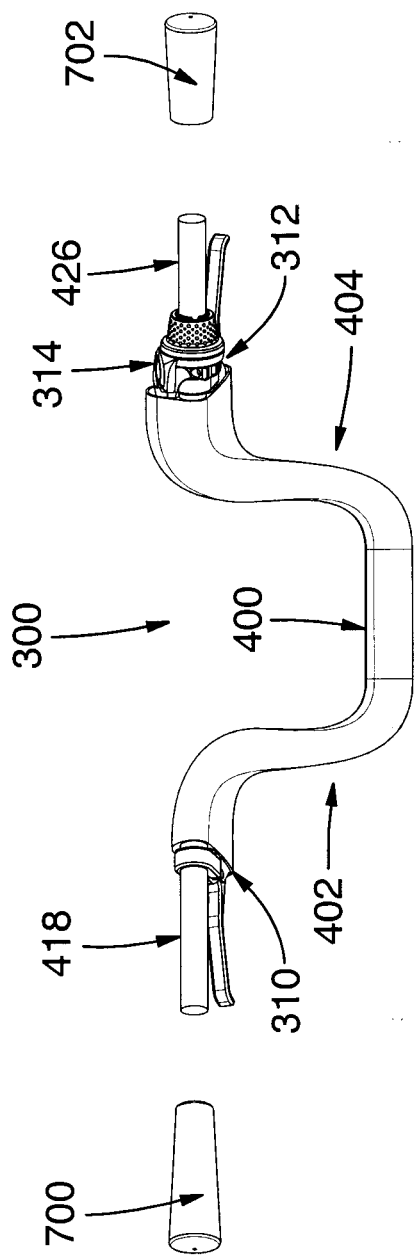
FIG. 8 is a back elevation view of the handlebar shown in FIG. 3, with the grips removed.
Figure 9:
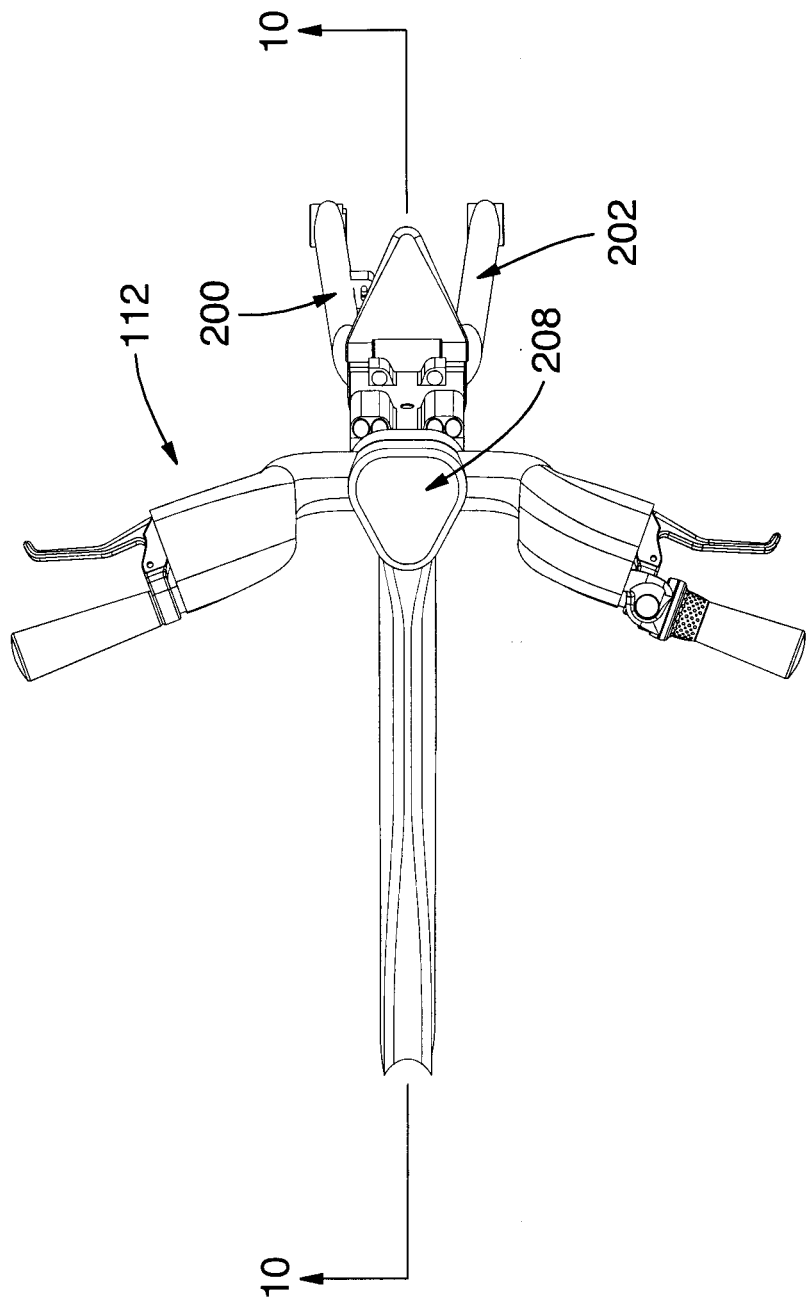
FIG. 9 is a partial top plan view of the bicycle shown in FIG. 1.

Still referring to FIG. 5, the opening 512 is partially closed by a mounting member 514, proximal to the back face 416. The mounting member 514 comprises a penannular hole (not shown) for mounting the left handle assembly 306 to the left handle mounting portion 402. More specifically and in this embodiment, the left handle assembly 306 comprises a tubular shaft 418 having an inner end 420 received in the penannular hole (not shown) and fixedly mounted to the mounting member 514, and an opposed outer end 422. The left handle assembly 306 further comprises a grip 700 (shown in FIG. 7) mounted over the shaft 418, as it will become apparent below. In one embodiment, the grip 700 is made from a rubber material for enhancing the grip of the user over the handlebar 112, while any other suitable material could be used such as plastic, polyvinyl chloride (PVC) or elastomer material.

The right handle portion 404 is also generally S-shaped and comprises a lower end 602, connected to the right end 408 of the central portion 400, and an upper end 604. The upper end 604 is located above the lower end 602 and extends outwardly (i.e. toward the right side of the bicycle 100) and gently backwardly (i.e. toward the user of the bicycle 100). Similarly to the central and left handle portions 400, 402, the right handle portion 404 is a hollow tube defined by an internal, bottom face 606, a spaced-apart internal, top face 516, a curved front face 608 and a curved back face 424, the curved front and back faces 516 and 424 connecting the internal, top face 606 and the external, bottom face 606 to one another.

Proximal to the upper end 604, the internal, top face 516 is provided with a lump 518 extending upwardly. As best shown in FIG. 6, the lump 518 provides the right handle mounting portion 404 with a generally L-shaped cross-section at this location. At the upper end 604 thereof, the right handle mounting portion 404 is provided with an L-shaped opening 610. The opening 610 is configured for receiving therein a portion of the right brake lever assembly 312 and allowing the passage of a rear brake cable 1014 (show in FIGS. 10 and 12). The opening 610 is further adapted to receive therein a portion of the gear shifter 314 and to allow the passage of a gear shifter cable 1016 (also shown in FIGS. 10 and 12), as it will become apparent below.

Similarly to the internal, top face 600 and the external, bottom face 508 of the left handle mounting portion 402, the internal, top face 516 and the external, bottom face 606 are leaning downwardly proximal to the upper end 604 of the right handle mounting portion 404 for enabling the reception of a portion of the right brake lever assembly 312 in the opening 610, while providing a user with an ergonomic position for actuating the brake lever assembly 312 during the operation of the bicycle 100.

Still referring to FIG. 6, the opening 610 is partially closed by a mounting member 612 located at the junction of the back face 424 and the external, bottom face 606. The mounting member 612 comprises a penannular hole (not shown) for mounting the right handle assembly 308 to the right handle mounting portion 404. Similarly to the left handle assembly 306, the right handle assembly 308 comprises a tubular shaft 426 having an inner end 428 received in the penannular hole (not shown) and fixedly mounted to the mounting member 612 and an opposed outer end 430. The right handle assembly 308 further comprises a grip 702 (shown in FIG. 7) mounted over the shaft 426, as it will become apparent below. In one embodiment, the grip 702 is made from the same material as grip 700, which material is preferably a rubber material for enhancing the grip of the user over the handlebar 112.

The left and right brake lever assemblies 310, 312 each include a bracket 704, 706 mountable to the shafts 418 and 426, respectively, and a lever 708, 710 mounted to the brackets 704, 706, respectively, for pivotal movement relative thereto. The brake lever assemblies 310, 312 further comprise brake cable connectors (not shown) connected to the levers 708 and 710. According to one embodiment, the gear shifter 314 is a twist-grip shifter and comprises an annular base member 712 for mounting the shifter 314 to the shaft 426 and a twist-grip operating member 714 rotatably mounted on the base member 714 for the user to modify the bicycle gear ratio. The gear shifter 314 also comprises a cable connector 718 for connecting the gear shifter cable 1010 to the gear shifter 314 (best shown in FIG. 12), as it will become apparent below.

Having described to general components of the handlebar 112, its assembly will now be described. The shafts 418 and 426 are positioned in the penannular holes (not shown) of the mounting members 514 and 612 of the left and right handle mounting portions 402 and 404, respectively, and fixedly fastened thereto. In one embodiment, the shafts 418 and 426 are welded to the mounting members 514 and 612, although any suitable fastening means could be used. The brake lever assemblies 310, 312 are then slid on the shafts 418, 426, respectively, until a portion of the brackets 704, 706 is received in the left handle mounting portion 402 or the right handle mounting portion 404, through openings 512 and 610, respectively, to be secured. In this position, the cable connectors (not shown) of the brake lever assemblies 310, 312 are received in the left handle mounting portion 402 and the right handle mounting portion 404. Once the brake lever assemblies have been properly installed on the shafts 418 and 426, the gear shifter 314 is slid on the shaft 426, the connector 718 extending in the right handle mounting portion 404, through the opening 610. The grips 700 and 702 are further slid on the shafts 418 and 426.

For mounting the handlebar 112 to the fork assembly 108, the stem cover 208 is removed from the stem plate 206 and the central portion 400 of the V-shaped hollow body 300 is properly positioned on the stem plate 206. In accordance with one embodiment, the stem plate is provided with a recess 210 for receiving therein a section of the central portion 400 of the V-shaped hollow body 300. Similarly, the stem cover comprises a recess 212 for receiving a complementary section of the central portion 400 of the V-shaped hollow body 300. As such, the central portion 400 is positioned in the recess 210 of the stem plate 206 and the stem cover 208 is placed on the stem plate 206, over the central portion 400. The cross-sections of the recesses 210 and 212 of the stem plate 206 and of the stem cover 208 being sized slightly smaller than the cross-section of the central portion 400, the stem cover 208 is prevented from adjoining the stem plate 206. Threaded fasteners (not shown) are then used to cause the stem cover 208 to move downwardly, toward the stem plate 206. As the stem cover 208 is moved downwardly by the threaded fasteners, the central portion 400 becomes squeezed or sandwiched in the recesses 210 and 212 of the stem plate 206 and of the stem cover 208, thereby securing the handlebar 112 to the fork assembly 108 (best shown in FIGS. 10 and 11).

According to one embodiment, the stem plate 206 is provided with a cable hole 1000 defined in the recess 210 for allowing the passage of the front and rear brake cables 1006, 1014 and the gear shifter cable 1016 toward the other parts of the bicycle 100. In this embodiment, the opening 502 defined on the bottom face 410 of the central portion 400 is configured to align with the hole 1000 of the stem plate 206 when the handlebar 112 is properly secured to the fork assembly.

Figure 10:
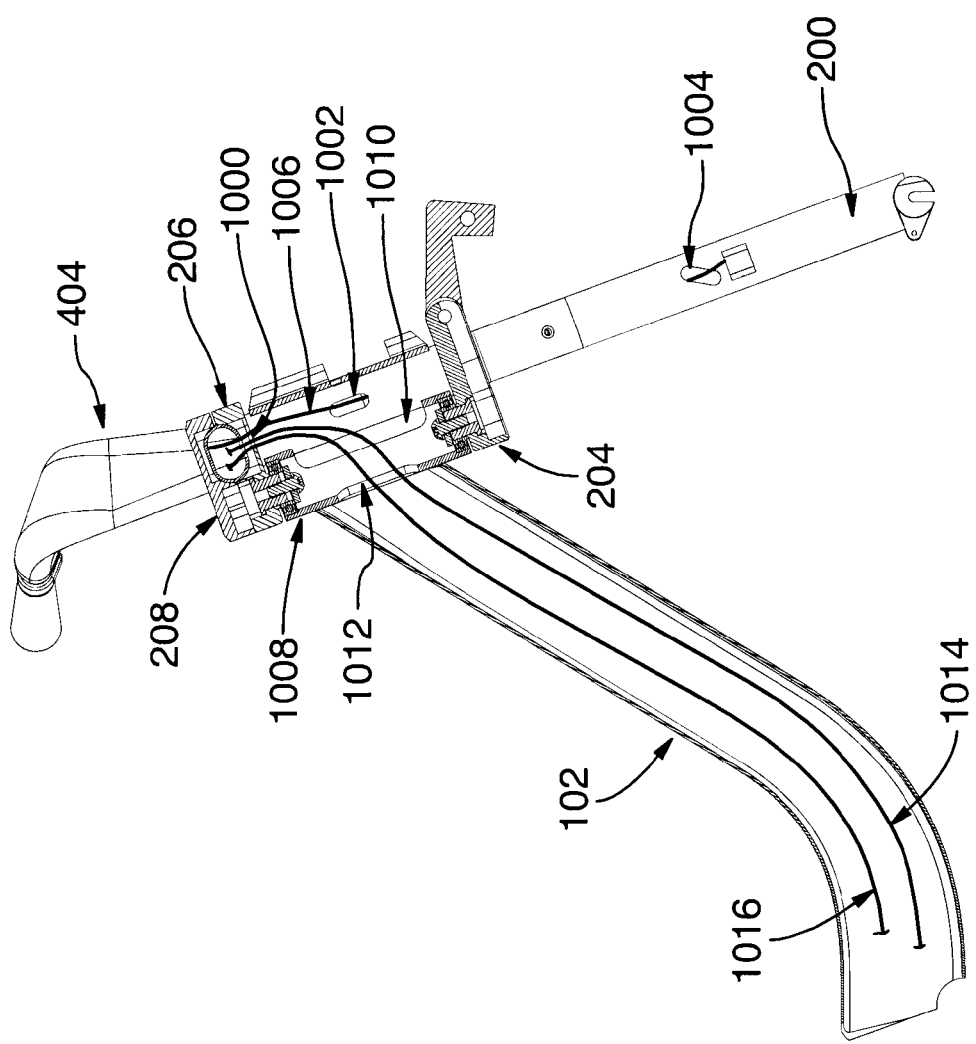
FIG. 10 is a cross-section view of the bicycle shown in FIG. 9, taken along line 10-10.
Figure 11:
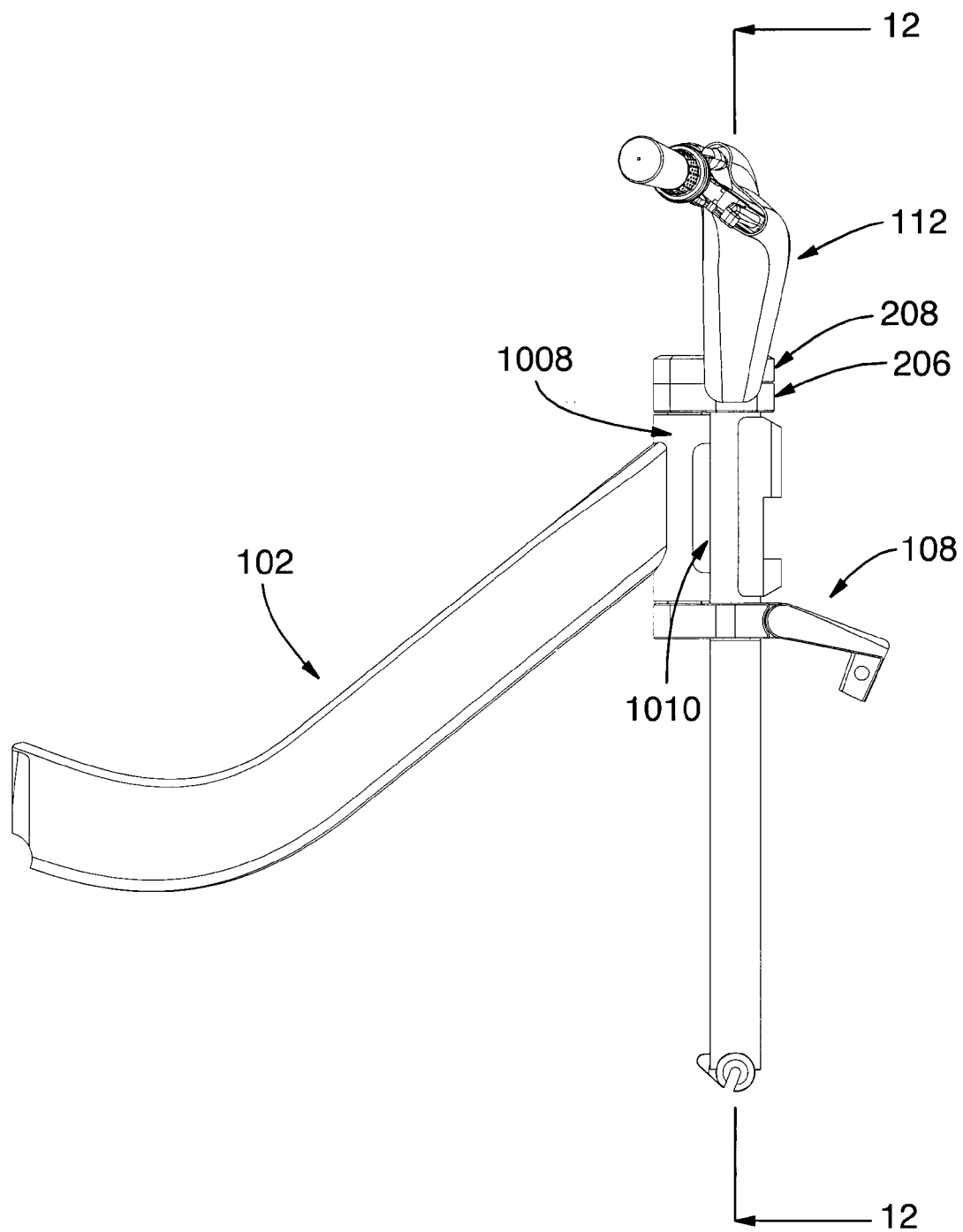
FIG. 11 is a partial right side elevation view of the bicycle shown in FIG. 1.

According to another embodiment, the blade 200 is provided with a first cable hole 1002 located between the stem plate 206 and the crown plate 204 and with a second cable hole 1004 (shown in FIG. 10). Together with the opening 410 of the V-shaped hollow body 300 and the hole 1000 of the stem plate 206, the first and second cable holes 1002, 1004 of the blade 200 enable running the front brake cable 1006 from the left brake lever assembly 310 to the front brake (not shown), inside the handlebar 112 and the blade 200 of the fork assembly 108 (best shown in FIGS. 10 and 12).

According to yet another embodiment, the frame 102 is provided with a head tube 1008 for mounting the fork assembly 108 to the frame 102. In this embodiment, the frame 102 is a hollow tube and the head tube 108 is provided with a front opening 1010 and with a back opening 1012, the front and back openings 1010 and 1012 providing access to the inside of the frame 102. Together with the opening 410 of the V-shaped hollow body 300 and the hole 1000 of the stem plate 206, the front and back openings 1010, 1012 enable running the rear brake cable 1014 from the right brake lever assembly 312 to the rear brake (not shown) and the gear shifter cable 1016 from the shifter 314 to the derailleur (not shown), inside the frame 102 (best shown in FIGS. 10 and 12). A person skilled in the art will appreciate that the configuration of the handlebar 112 allows housing the brake and shifter cables 1006, 1014 and 1016 inside the handlebar 112, thereby reducing premature wear thereto.

According to a further embodiment, the bicycle 100 may be provided with electronic or electric systems and other accessories such as, for instance, an electronic speedometer or front and back headlights. Therefore, the bicycle 100 can comprise a battery or other electric sources (not shown) mounted to the bicycle 100 and electric cables (not shown) running from the electric source to the various accessories requiring electric power. A person skilled in the art will appreciate that, similarly to the front brake cable 1006, the rear brake cable 1014 and the gear shifter cable 1016, such electronic or electric cables may be routed inside the frame 102, the fork assembly 108 and the V-shaped hollow body 300 of the handlebar 112.

While in this embodiment, shafts 418 and 426 are mounted to the hollow body 300 via mounting members 514 and 612, a skilled addressee will appreciate that other handlebar configurations are possible. For instance, an alternate embodiment of a handlebar 1300 is shown in FIGS. 13 to 15.

The handlebar 1300 comprises a generally V-shaped tubular member 1302 (best shown in FIGS. 14 and 15) provided with a lower, central stem portion 1500 from which upwardly and outwardly extend a pair of left and right handle mounting portions 1502, 1504. Mounted to the tubular member 1302 is a hollow body 1304. The hollow body 1304 comprises left and right hollow body portions 1306, 1308 mounted to the left and right handle mounting portions 1502, 1504 of the tubular member 1302, respectively. Together, the left and right hollow body portions 1306, 1308 define a structure similar to hollow body 300, with the exception of the central stem portion 1500 that is defined by the tubular member 1302 rather than by the hollow bodies 1306, 1308 themselves. In this embodiment, the left hollow body portion comprises a back shell 1506 and a front shell 1508. Similarly, the right hollow body portion 1306 comprises a back shell 1507 and a front shell 1509.

Taking the left hollow body portion 1306 as example, the assembly of the left and right hollow bodies 1306, 1308 to the tubular member 1302 will now be described. A skilled addressee will appreciate that the right hollow body 1308 is assembled in a way similar to assembly of hollow body 1306.

Figure 13:
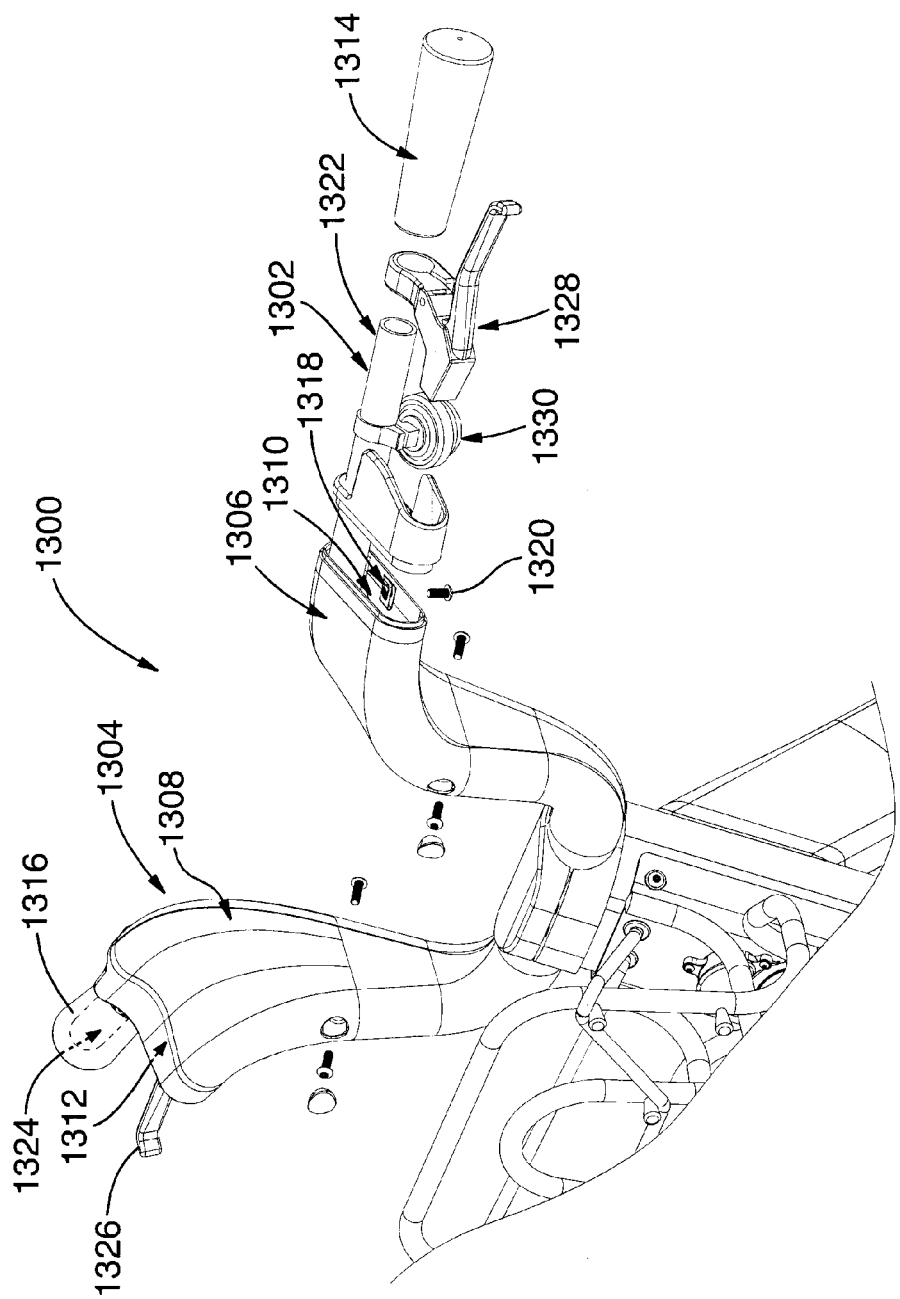
FIG. 13 is a front left perspective view, partly exploded, of another embodiment of a handlebar.
Figure 14:
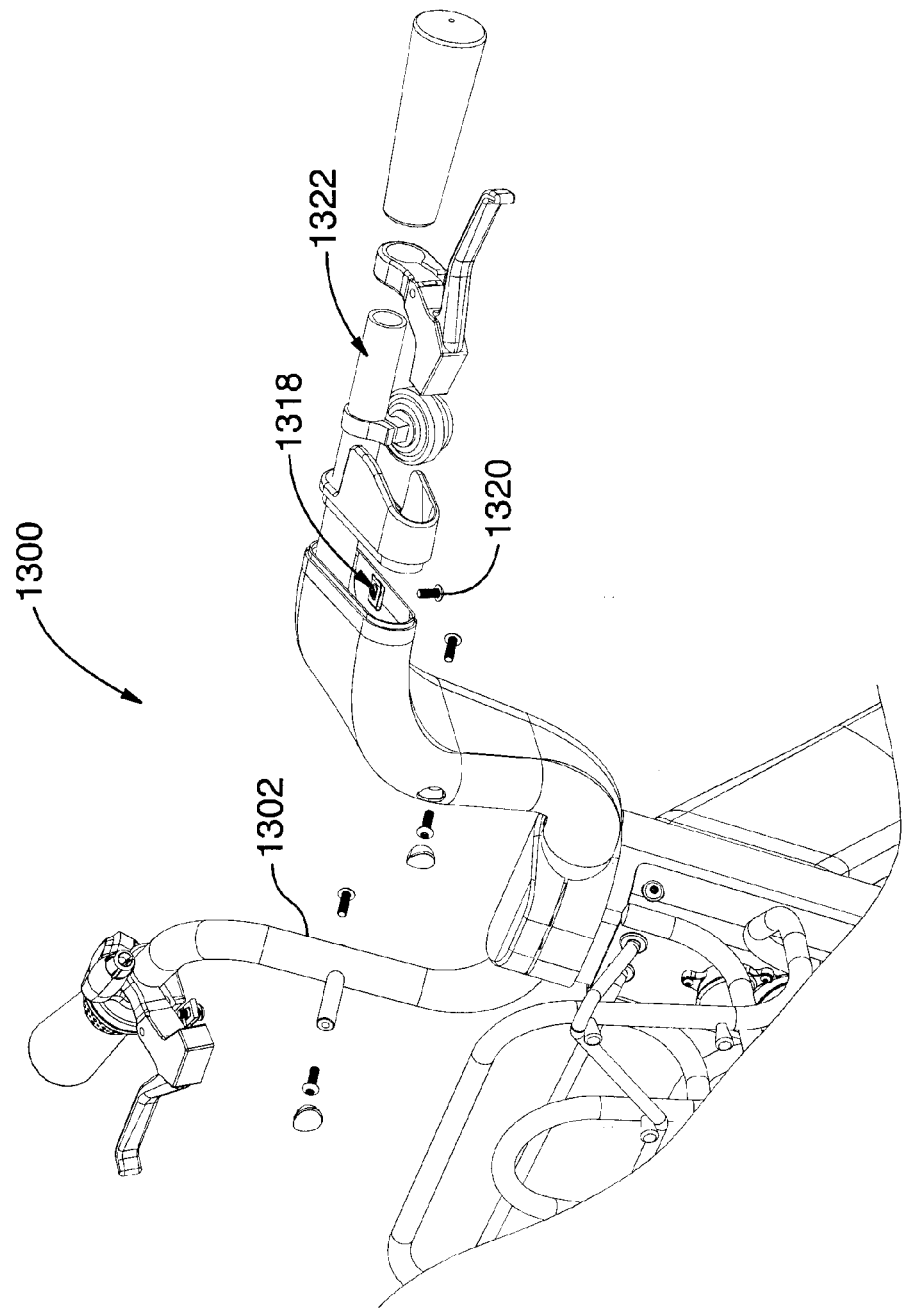
FIG. 14 is a front left perspective view, partly exploded, of the other embodiment of a handlebar shown in FIG. 13, in which one part of the hollow body has been removed.
Figure 15:
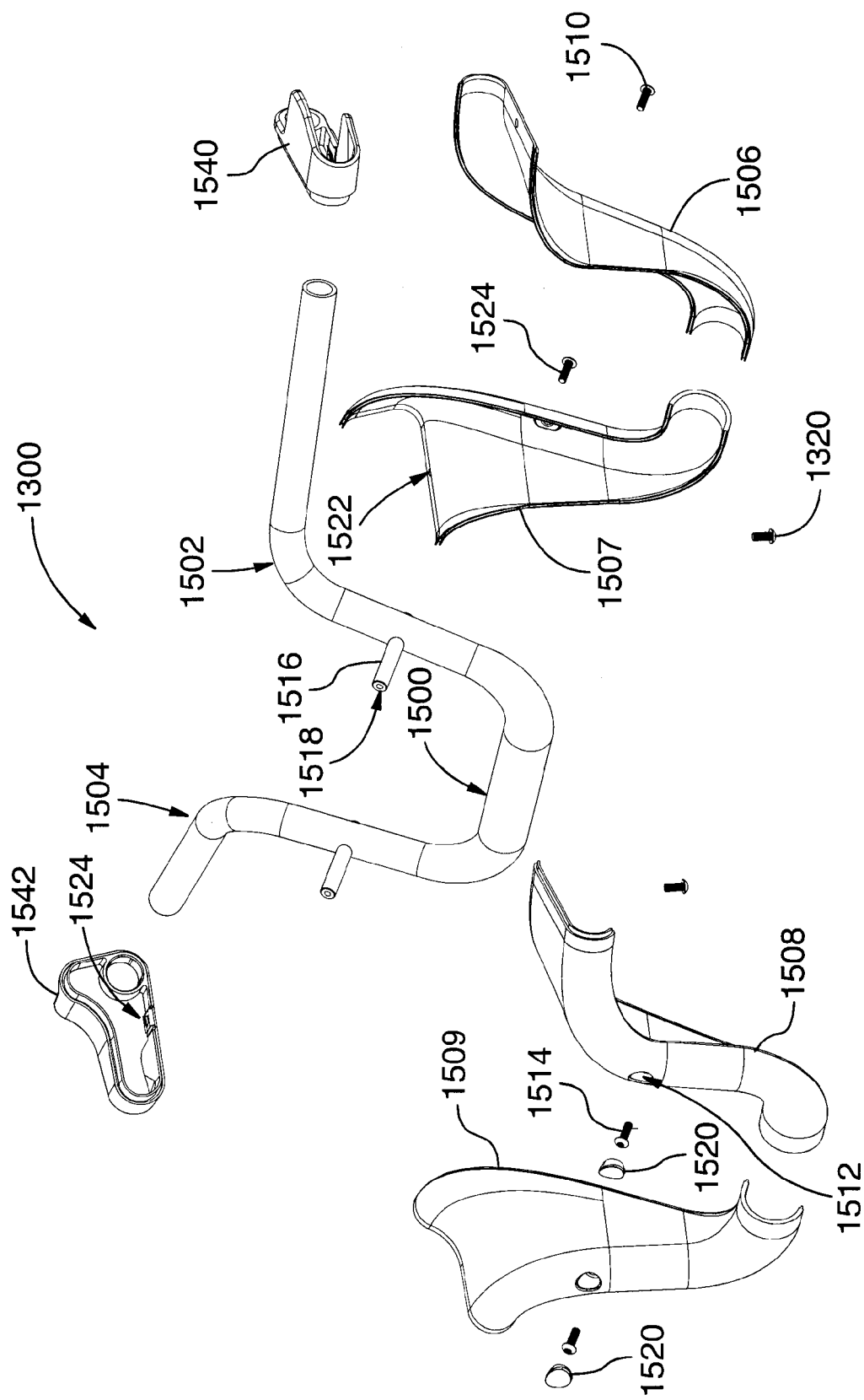
FIG. 15 is a front left perspective, exploded, view of the handlebar shown in FIG. 13.

The left hollow body portion 1306 comprises a back shell 1506 and a complementary front shell 1508 (shown in FIGS. 13 and 15). Defined in the back shell 1506 is a bore (not shown) provided with a flange (not shown) for receiving therein a threaded fastener 1510. Similarly, the front shell 1508 is provided with a flanged bore 1512 for receiving another threaded fastener 1514.

For fastening the back and front shells 1506, 1508 to the tubular member 1302, the left handle mounting portion 1502 of the tubular member 1302 is provided with a left threaded tube or spacer 1516 extending frontwardly and through the thickness of the tubular member 1302, perpendicularly thereto. Accordingly, the threaded tube 1516 provides the tubular member 1302 with a back threaded hole (not shown) and a front treaded hole 1518 for receiving therein threaded fasteners 1510 and 1514, respectively.

For assembling the left hollow body portion 1306, the flanged hole 1512 of the front shell 1508 is aligned with the front threaded hole 1518 of the threaded tube 1516. The fastener 1514 is then inserted through the flanged hole 1512 and secured until the front shell 1508 is properly positioned on the tubular member 1302. The flanged hole (not shown) of the back shell 1506 is then aligned with the back threaded hole (not shown) of the threaded tube 1516. The fastener 1510 is then inserted through the flanged hole (not shown) and secured until the back shell 1506 is properly positioned on the tubular member 1302 and relative to the front shell 1508. For closing the flanged holes 1512 after the threaded fasteners 1510 and 1514 have been secured and hiding the head thereof, plugs or screw covers 1520 are inserted in the flanged holes 1512.

The right hollow body portion 1308 is assembled to the tubular member 1302 in a similar fashion, as it will be appreciated by a skilled addressee. The skilled addressee will further appreciate that various other techniques may be used for securing the shells 1506, 1508 to the left and right handle mounting portions 1502, 1504 of the tubular member 1302 such as by gluing, welding or the like.

As best shown in FIGS. 13 and 14, when the front and back shells 1508, 1509 and 1506, 1507 of the left and right hollow body portions 1306, 1308 are assembled, left and right control openings 1310, 1312 are defined. Further, a portion of the left and right handle mounting portions 1502, 1504 extends outwardly from the control openings 1310, 1312 to define left and right handle tubular shafts 1322, 1324. The left and right handle tubular shafts 1322, 1324 are adapted for mounting left and right handle grips 1314, 1316, brake levers 1326, 1328 and gear shifter 1330 to the handlebar 1300.

For closing the left and right control openings 1310, 1312 while allowing control cables to enter the inner cavity of the hollow body, a left handle cover 1540 and a right handle cover 1542 may be provided (best shown in FIG. 15). Referring to FIGS. 13 to 15, the assembly of these handle covers 1540 and 1542 will be described. The back shell 1506 of the left hollow body 1306 is provided with a hole 1318 and the left handle cover 1540 is provided with a corresponding threaded hole (not shown). Once the left handle cover 1540 is properly positioned on the tubular member 1302, the threaded hole of the left handle cover 1540 and the threaded hole 1318 of the back shell 1506 are aligned to one another. This allows securing the left handle cover 1540 to the left hollow body 1306 using a threaded fastener 1320. Similarly, the back shell 1507 of the right hollow body portion 1308 is provided with a hole 1522 aligned with a corresponding threaded hole 1524 in the right handle cover 1542 properly positioned on the tubular member 1302. This configuration allows securing the right handle cover 1542 to the right hollow body 1308.

While in this embodiment threaded fasteners such as bolts or screw are used, a skilled addressee will appreciate that any other suitable types of fastening means could be used. For instance, the back and front shells 1506, 1507, 1508 and 1509 may be secured to the tubular member 1302 using rivets, snaps and the like.

Because the stem portion 1500 of the tubular member 1302 is not covered in this embodiment by any of the left and right hollow body portions 1306, 1308, a cable (not shown) routed in the hollow body 1300 can exit the inner cavity of the hollow body 1300 in this region to enter the fork assembly, as previously described.

A skilled addressee will appreciate that the configurations of the above described embodiments are of great advantage. More specifically, the above configurations of handlebars (e.g. handlebars 112 and 1300) enable internal routing of control cables or wires, such as break and gear shifter cables, inside the hollow bodies, (e.g. hollow bodies 300 and 1304, respectively). Further, because the hollow bodies of handlebars 112 and 1300 are provided with openings (e.g. openings 512 and 610, as well as 1310 and 1312) and in some embodiments with cover openings (e.g. covers 1540 and 1542), the controls (e.g. 310, 312, 710, 1326, 1328 and 1330) are positioned such that cables running therefrom towards the fork assembly directly enter the cavities defined by the hollow bodies and are not exposed to surrounding environment, even during operation of such controls. Such an internal routing of control cables advantageously contributes to preventing premature wear of the cables or wires caused by a scrubbing of the cables or wires against the various components of the handlebar. Protecting the cables and wires passing through the handlebar further prevents the control cables from being exposed to natural elements such as rain and dust, which in turn contributes to preventing the cables and wires from being damaged. Cables or wires routed in the handlebar are further protected from vandalism. This is of great advantage, especially if the bicycle is used in a bicycle sharing program in which bicycles are usually stored in public areas.

Although the foregoing description and accompanying drawings relate to specific preferred embodiments of the present invention as presently contemplated by the inventor, it will be understood that various changes, modifications and adaptations, may be made.

The invention claimed is:
1. A handlebar for a bicycle provided with a fork assembly, said handlebar comprising:
   a hollow body comprising
      a left end,
      a right end,
      at least one control opening located proximal to at least one of said left end and said right end of said hollow body,
      a central stem portion defining a fork mounting portion and having a left end, a right end, a plan bottom face and a plan top face extending between the left end and the right end of said central stem portion, said fork mounting portion extending between said left end and said right end of said hollow body, and being adapted for mounting said handlebar to said fork assembly and comprising a fork opening;

a left handle shaft extending from said left end of said hollow body;

a right handle shaft extending from said right end of said hollow body;

at least one control mounted to at least one of said left handle shaft and said right handle shaft proximal to said at least one control opening such that said at least one control opening and said fork opening enable routing of at least one control cable running from said at least one control toward said fork assembly inside said hollow body, said at least one control cable remaining unexposed during operation of said at least one control;

said hollow body further comprising a left handle mounting portion having a lower end and an upper end, said left handle mounting portion extending from said left end of said central stem portion;

said hollow body further comprising a right handle mounting portion having a lower end and an upper end, said right handle mounting portion extending from said right end of said central stem portion, wherein said left handle mounting portion, said central stem portion and said right handle mounting portion define an integral structure, and wherein said left handle mounting portion and said right handle mounting portion are S-shaped.

2. The handlebar as claimed in claim 1, wherein said handlebar is V-shaped.

3. The handlebar as claimed in claim 2, further wherein said hollow body comprises a left control opening located proximal to said left end of said hollow body and a right control opening located proximal to said right end of said hollow body; further wherein said at least one control comprises:

a left brake lever assembly mounted to said left handle shaft proximal to said left control opening;

a right brake lever assembly mounted to said right handle shaft proximal to said right control opening; and a gear shifter mounted to said right handle shaft proximal to said right control opening.

4. The handlebar as claimed in claim 3, wherein said hollow body comprises a left hollow body portion and a right hollow body portion, said left handle shaft and said right handle shaft being connected to said fork mounting portion and extending through said left hollow portion and said right hollow portion.

5. The handlebar as claimed in claim 4, wherein said left handle shaft, said right handle shaft and said fork mounting portion define an integral structure.

6. The handlebar as claimed in claim 1, wherein said at least one control is selected from a group consisting of a brake lever assembly and a gear shifter.

7. The handlebar as claimed in claim 1, wherein said plan bottom face and said plan top face are connected to one another using a pair of spaced-apart back and front curved faces.

8. The handlebar as claimed in claim 1, wherein said upper end of said left handle mounting portion comprises a left opening for receiving a portion of said left brake lever assembly, further wherein said right handle mounting portion comprises a right opening for receiving a portion of said right brake lever assembly and a portion of said gear shifter.

9. The handlebar as claimed in claim 8, wherein said left opening comprises a left mounting member and said right opening comprises a right mounting member.

10. The handlebar as claimed in claim 9, wherein said left handle shaft is fixedly mounted to said left mounting member of said left opening and said right handle shaft is fixedly mounted to said right mounting member of said right opening.

11. The handlebar as claimed in claim 10, further comprising at least one handle grip mounted over at least one of said left handle shaft and said right handle shaft.

12. The handlebar as claimed in claim 11, wherein said at least one handle grip is manufactured using a material selected from a group consisting of rubber, plastic, polyvinyl chloride (PVC) and elastomer.

13. The handlebar as claimed in claim 10, wherein said left brake lever assembly comprises a left bracket mountable to said left handle shaft, a left lever mounted to said left bracket for pivotal movement relative thereto and a left brake cable connector connected to said left lever.

14. The handlebar as claimed in claim 10, wherein said right brake lever assembly comprises a right bracket mountable to said right handle shaft, a right lever mounted to said right bracket for pivotal movement relative thereto and a right brake cable connector connected to said right lever.

15. The handlebar as claimed in claim 10, wherein said gear shifter comprises a twist-grip shifter having an annular base member for mounting said gear shifter to said right handle shaft and a twist grip operating member rotatably mounted on said annular base member for enabling a user to modify a bicycle gear ratio, said gear shifter further comprising a cable connector.

16. The handlebar as claimed in claim 1, wherein said hollow body is manufactured using a material selected from a group consisting of aluminum, carbon fibers, steel, titanium and magnesium.

* * * * *